United States Patent
Cromer et al.

(10) Patent No.: US 6,275,851 B1
(45) Date of Patent: Aug. 14, 2001

(54) DATA PROCESSING SYSTEM AND METHOD FOR REMOTELY CONTROLLING MODIFICATION OF A CLIENT'S INITIALIZATION SETTINGS

(75) Inventors: Daryl Carvis Cromer, Cary; Richard Alan Dayan, Wake Forest; Brandon Jon Ellison, Raleigh; Eric Richard Kern, Durham; Randall Scott Springfield, Chapel Hill, all of NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/206,628

(22) Filed: Dec. 7, 1998

(51) Int. Cl.$^7$ .................................................. G06F 13/00
(52) U.S. Cl. .......................... 709/217; 709/224; 713/2; 713/100
(58) Field of Search .................................. 709/217, 218, 709/219, 220, 224; 713/1, 2, 100, 201

(56) References Cited

U.S. PATENT DOCUMENTS

| | | |
|---|---|---|
| 5,230,052 | 7/1993 | Dayan et al. .......................... 395/700 |
| 5,504,905 | 4/1996 | Cleary et al. ......................... 395/700 |
| 5,579,522 | 11/1996 | Christeson et al. .................... 395/652 |
| 5,623,604 | 4/1997 | Russell et al. ..................... 395/200.1 |
| 5,675,800 * | 10/1997 | Fisher, Jr. et al. ........................ 713/2 |
| 5,680,547 | 10/1997 | Chang ............................. 395/200.01 |
| 5,694,583 | 12/1997 | Williams et al. ..................... 395/400 |
| 5,793,943 | 8/1998 | Noll ................................ 395/182.04 |
| 5,978,911 * | 11/1999 | Knox et al. .............................. 713/1 |

* cited by examiner

Primary Examiner—Viet D. Vu
(74) Attorney, Agent, or Firm—Bracewell & Patterson, LLP

(57) ABSTRACT

A data processing system and method are described for permitting a server computer system to remotely control modifications of initialization settings included within a client computer system. The client computer system is coupled to a server computer system to form a network. During a set-up process executing within the client computer system, the client computer system receives an attempted modification of one of a plurality of initialization settings utilized during booting. In response to the attempted modification, the server computer system determines whether the modification is prohibited. In response to the modification being prohibited, the server computer system prohibits the modification of the one of said plurality of initialization settings, wherein the client computer system is prohibited from booting utilizing the modified one of said plurality of initialization settings.

10 Claims, 9 Drawing Sheets

DATA PROCESSING SYSTEM AND METHOD FOR REMOTELY CONTROLLING MODIFICATION OF A CLIENT'S INITIALIZATION SETTINGS

CROSS-REFERENCE TO RELATED APPLICATIONS

The present invention is related to the subject matter of co-pending patent application Ser. No. 09/201,572 entitled "DATA PROCESSING SYSTEM AND METHOD FOR REMOTELY ACCESSING A CLIENT COMPUTER SYSTEM'S INDIVIDUAL INITIALIZATION SETTINGS WHILE THE CLIENT IS POWERED OFF" filed on Nov. 30, 1998, and Ser. No. 09/024,231 entitled "FULL TIME NETWORK AUXILIARY PROCESSOR FOR A NETWORK CONNECTED PC" filed on Feb. 17, 1998, both assigned to the assignee herein named and incorporated herein by reference.

BACKGROUND OF THE INVENTION

1. Field of the Invention

The present invention relates in general to data processing systems and, in particular, to a data processing system and method including a server and client computer system coupled together utilizing a network. Still more particularly, the present invention relates to a data processing system and method including a server and client computer system coupled together utilizing a network for remotely controlling modification of a client's initialization settings.

2. Description of the Related Art

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. Examples of such personal computer systems are IBM's PC series, Aptiva series, and Thinkpad series.

With PCs being increasingly connected into networks to allow transfers of data among computers to occur, more operations such as maintenance, updating of applications, and data collections are occurring over the network. Computer networks are also becoming essential to their user. It is desirable to minimize loss of productivity by increasing availability of network resources.

With the evolution from mainframe and dumb terminal to client-server networks, computing has created several issues for Information Services (IS) managers. In the mainframe/dumb terminal world, the communication path was from the terminal to the mainframe and then to other systems. In the client-server world, the client has the ability to send messages to and from other clients, as well as to the server.

When a computer is reset or initially powered-on, a boot process begins. First, POST begins executing. POST is an initialization code which configures the system utilizing initialization settings stored in a storage device, such as CMOS storage. Once POST has configured the system, BIOS then controls the basic operation of the hardware utilizing the hardware as it was configured by POST. The boot process is complete once an operating system has been handed control of the system. In order for the boot process to be complete, POST must complete its execution.

A computer system requires a basic input/output system (BIOS) in order to operate. The BIOS is code that controls basic hardware operations, such as interactions with disk drives, hard drives, and the keyboard.

POST and BIOS are both typically stored as a single image in a storage device such as a flash memory. In addition, a default or backup copy of the initialization settings may also be stored in the flash memory.

The initialization settings stored in CMOS may be damaged. When this occurs, the only option is to restore the default values stored in the flash. When the default copy is restored, any previous configuration information (user modifications) in the system is no longer known. Therefore, a user must re-customize the system which may be very time consuming. In order to customize the initialization settings, the user must go into a setup screen and manually modify the settings.

Therefore a need exists for a data processing system and method for a server computer system remotely controlling modifications of a client computer system's initialization settings.

SUMMARY OF THE INVENTION

A data processing system and method are described for permitting a server computer system to remotely control modifications of initialization settings included within a client computer system. The client computer system is coupled to a server computer system to form a network. During a set-up process executing within the client computer system, the client computer system receives an attempted modification of one of a plurality of initialization settings utilized during booting. In response to the attempted modification, the server computer system determines whether the modification is prohibited. In response to the modification being prohibited, the server computer system prohibits the modification of the one of said plurality of initialization settings, wherein the client computer system is prohibited from booting utilizing the modified one of said plurality of initialization settings.

The above as well as additional objectives, features, and advantages of the present invention will become apparent in the following detailed written description.

BRIEF DESCRIPTION OF THE DRAWINGS

The novel features are set forth in the appended claims. The present invention itself, however, as well as a preferred mode of use, further objectives, and advantages thereof, will best be understood by reference to the following detailed description of a preferred embodiment when read in conjunction with the accompanying drawings, wherein:

DESCRIPTION OF A PREFERRED EMBODIMENT

Figure 1:
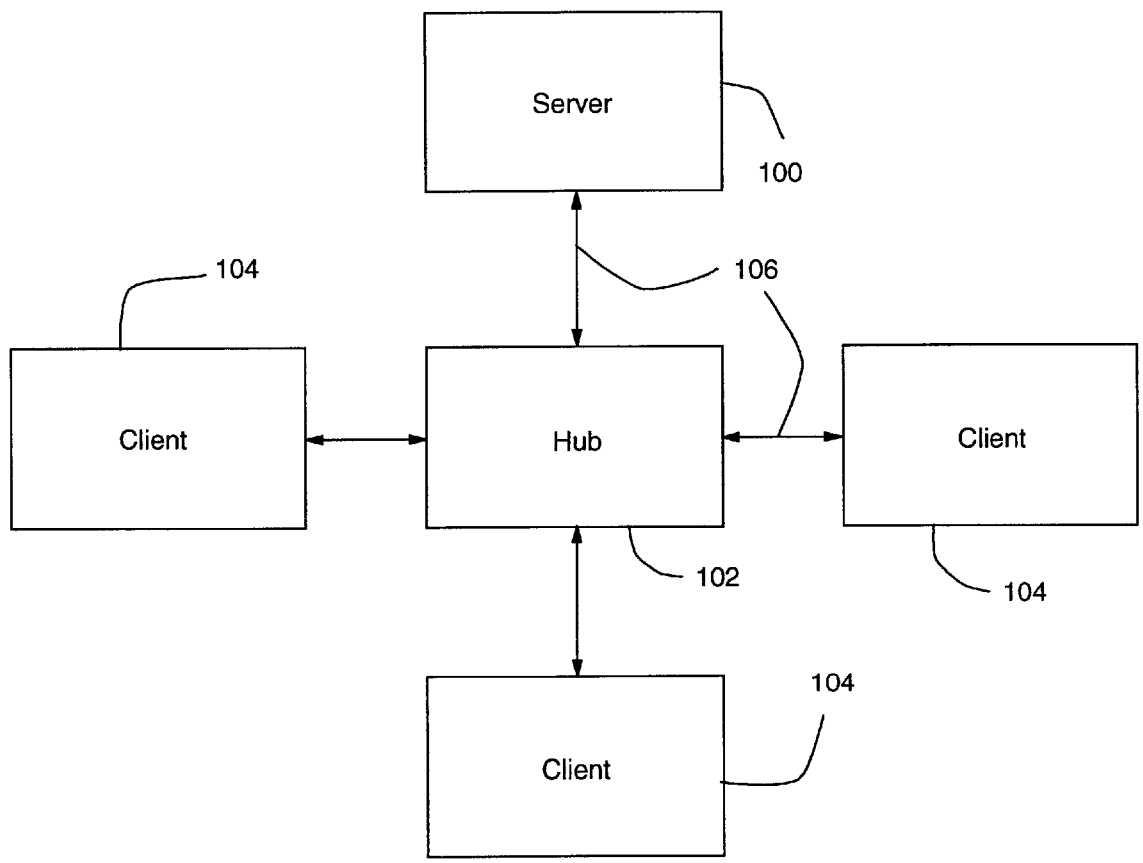
FIG. 1 illustrates a pictorial representation of a data processing system including a plurality of client computer systems coupled to a server computer system utilizing a network and a hub in accordance with the method and system of the present invention.

A preferred embodiment of the present invention and its advantages are better understood by referring to FIGS. 1–8 of the drawings, like numerals being used for like and corresponding parts of the accompanying drawings.

The present invention is a method and system for permitting a server computer system to remotely control modifications of initialization settings included with a client computer system coupled to the server utilizing a network. The client computer system executes a set-up process after the client is reset. A user may attempt to modify one or more of the initialization settings prior to the client completing the boot, i.e. prior to the completion of the set-up process. If the user attempts to modify one or more of these settings, the server computer system is notified of this attempt and determines whether the particular modification the user is attempting to make is permitted.

If the server determines that the modification is permitted, the server transmits a network packet to the client which includes a command permitting the modification. If the server determines that the modification is prohibited, the server transmits a network packet to the client which includes a command prohibiting the modification.

The server may determine whether a particular modification is permitted based on the identity of the particular user attempting to make the modification. The network packet which the client transmits in response to an attempted modification may include an identification of the user who has logged on to the computer. Based on the identity of the particular user, the server will determine whether the particular modification is permitted. A particular modification may be permitted for a first user to make, while being prohibited for a second user.

The server computer system maintains a safe copy of the initialization settings utilized during the last successful boot of the client computer system. This copy may either be transmitted to the server in response to a successful boot of the client, or a copy of each modified setting may be transmitted to the server after the modifications are made.

If the client cannot complete the set-up process, i.e. cannot complete its boot, the client computer system transmits a network packet to the server computer system indicating this failure. The server computer system then transmits a network packet to the client which includes a safe copy of all of the initialization settings, or a copy of one or more of the initialization settings.

In this manner, the initialization settings will never be the cause of a failure of the client computer system to boot. A user may modify the settings and be assured that the client will be able to boot utilizing the modified settings. The determination of whether modifications to the settings will be permitted, and the transmission of a safe copy of the settings occurs prior to a completion of the set-up process. Therefore, a failure of the client computer system to boot due to a problem with the initialization settings is avoided because the server pre-approves modifications to the settings, and the server will transmit a known, good copy of the settings which may be utilized to boot in the event of a problem with the settings. This process occurs prior to a boot failure.

FIG. 1 illustrates a pictorial representation of a data processing system including a plurality of client computer systems 104 coupled to a server computer system 100 utilizing a hub 102 in accordance with the method and system of the present invention. Server computer system 100 is connected to a hub 102 utilizing a local area network (LAN) connector bus 106. Respective client systems 104 also connect to hub 102 through respective LAN busses 106. The preferred form of the network conforms to the Ethernet specification and uses such hubs. It will be appreciated, however, that other forms of networks may be utilized to implement the invention.

The term "network" includes any type of data communications channel, such as an Ethernet network, token ring, or X.10 or X.25. Those skilled in the art will recognize that the invention described herein may be implemented utilizing any type of data communications channel. However, the preferred embodiment is implemented utilizing an Ethernet network.

Figure 2:
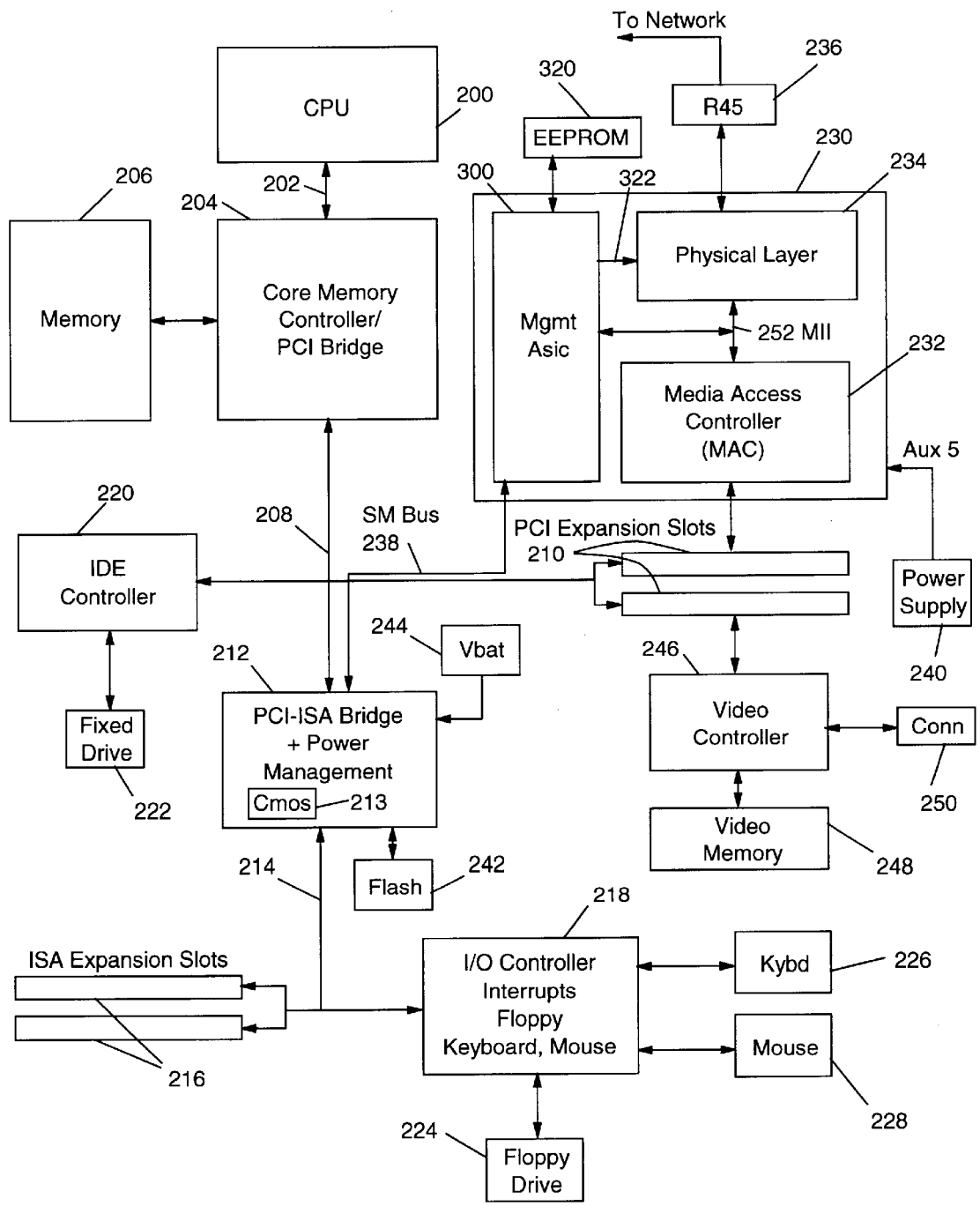
FIG. 2 depicts a pictorial representation of a network adapter included within either a client or a server computer system in accordance with the method and system of the present invention.

FIG. 2 illustrates a pictorial representation of a network adapter 230 included within a client computer system in accordance with the method and system of the present invention. A central processing unit (CPU) 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices such as fixed disk drive 222. PCI/ISA bridge 212 provides an interface between PCI bus 208 and an optional feature or expansion bus such as the ISA bus 214. PCI/ISA bridge 212 includes power management logic. A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller 212 includes an interface for a flash memory 242 which includes microcode which client 104 executes upon power-on. Flash memory 242 is an electrically erasable programmable read only memory (EEPROM) module and includes POST and BIOS that are used to interface between the I/O devices and operating system. PCI-ISA bridge controller 212 also includes CMOS storage 213 that holds initialization settings which represents system configuration data. Storage 213 includes values which describe the present configuration of client 104. For example, storage 213 includes information describing the list of initial program load (IPL) devices set by a user and the sequence to be used for a particular power-on method, the type of display, the amount of memory, time date, etc. Furthermore, this data is stored in storage 213 whenever a special configuration program, such as configuration/setup is executed. PCI-ISA bridge controller 212 is supplied power from battery 244 to prevent loss of configuration data in storage 213.

Client system 104 includes a video controller 246 which may, for example, be plugged into one of connector slots 210. Video controller 246 is connected to video memory 248. The image in video memory 248 is read by controller 246 and displayed on a monitor (not shown) which is connected to client 104 through connector 250.

A client system 104 includes a network adapter 230 which may, for example, be plugged into one of the PCI connector slots 210 (as illustrated) or one of the ISA connector slots 216 in order to permit client 104 to communicate with a LAN via connector 236 to hub 102.

Client computer system 104 includes a power supply 240 which supplies full normal system power, and has an auxiliary power main AUX 5 which supplies full time power to the power management logic 212 and to the network adapter 230. This enables client 104 to respond to a wakeup signal from network adapter 230. In response to a receipt of the wakeup signal, power supply 240 is turned on and then powers up client 104.

Network adapter 230 includes a physical layer 234 and a media access controller (MAC) 232 connected together utilizing a Media Independent Interface (MII) bus 252. The MII bus 252 is a specification of signals and protocols which define the interfacing of a 10/100 Mbps Ethernet Media Access Controller (MAC) 232 to the underlying physical layer 234.

MAC 232 processes digital network signals, and serves as an interface between a shared data path, i.e. the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as data transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mb/s CSMA/CD Ethernet applications. Physical layer 234 receives parallel data from the MII local bus 252 and converts it to serial data for transmission through connector 236 and over the network. Physical layer 234 is also responsible for wave shaping and provides analog voltages to the network. In a preferred embodiment, physical layer 234 is implemented utilizing an Integrated Services chip ICS-1890.

Physical layer 234 includes auto-negotiation logic that serves three primary purposes. First, it determines the capabilities of client computer 104. Second, it advertises its own capabilities to server computer 100. Third, it establishes a connection with server computer 100 using the highest performance connection technology.

Network adapter 230 includes a special purpose processing unit 300 coupled to the MII bus 252 between physical layer 234 and MAC 232. Special purpose processing unit 300 may be a "hard wired" application specific integrated circuit (ASIC) or a programmed general-purpose processor which is programmed as more fully described below. By coupling ASIC 300 to the MII bus 252, ASIC 300 may send and receive network packets using physical layer 234.

Data from client computer system 104 is accessed by ASIC 300 over a system management bus (SM) 238. System management bus 238 is a two-wire low speed serial bus used to interconnect management and monitoring devices. With the trickle power supplied by signal AUX 5 from power supply 240, ASIC 300 is preferably powered full time when power supply 240 is physically coupled to an electrical connector. Micro-controller 302 (shown in FIG. 3) included within ASIC 300 is coupled to bridge controller 212 via the System Management (SM) bus 238 through SM bus interface 316. This provides a path to allow software running on client 104 to access ASIC and EEPROM 320.

Figure 3:
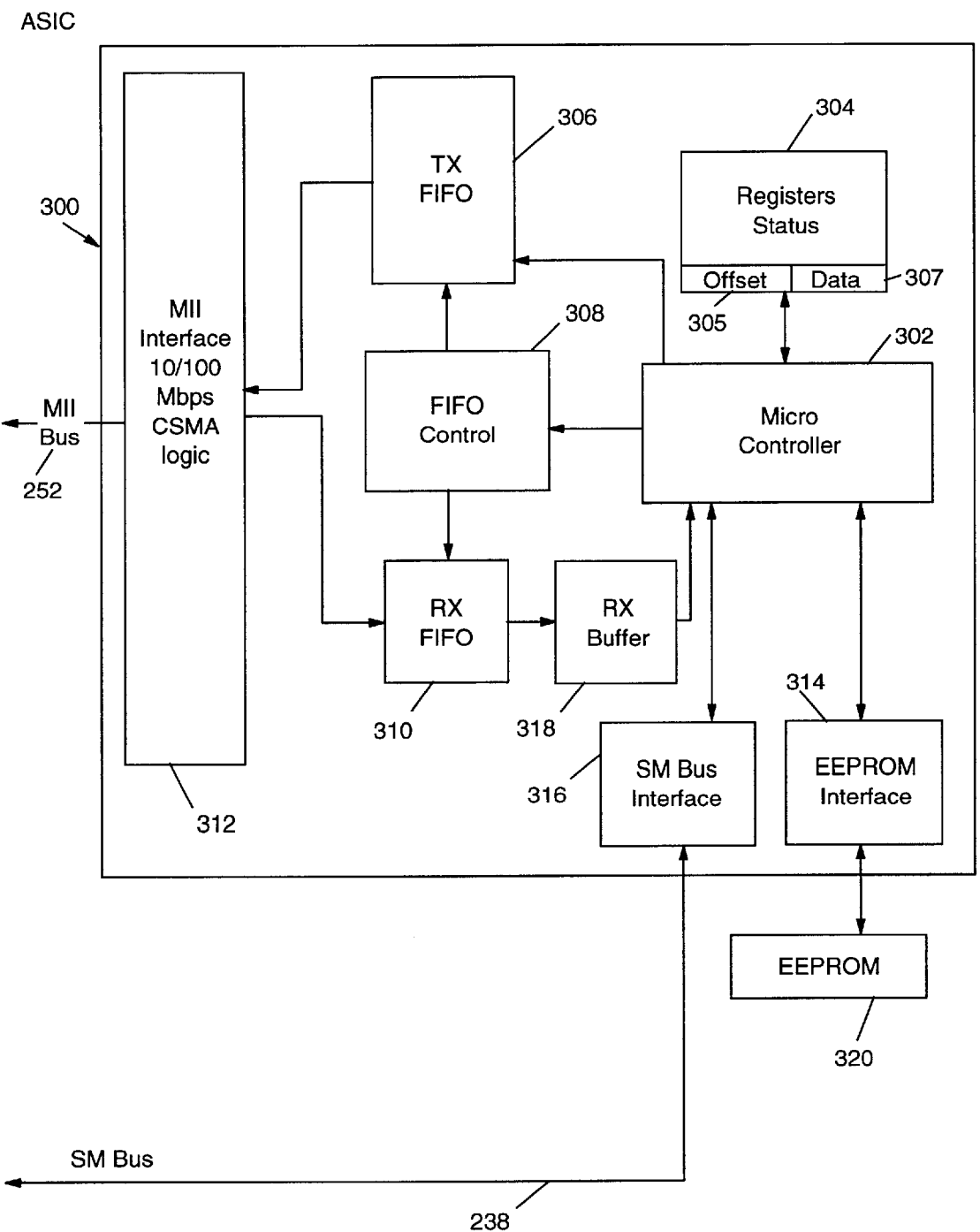
FIG. 3 illustrates a pictorial representation of a special purpose processing unit which is included within the network adapter of FIG. 2 in accordance with the method and system of the present invention.

FIG. 3 illustrates a pictorial representation of ASIC 300 which is included within a network adapter 230 included within a client computer system 104 in accordance with the method and system of the present invention. ASIC 300 includes a micro-controller 302 which includes several state machines to handle the following tasks: packet reception, SM bus interface, and EEPROM updates. Micro-controller 302 sends commands to FIFO control 308 to control data flow from TX FIFO 306, RX FIFO 310, and RX Buffer 318. Micro-controller 302 also responds to SM bus requests from software running on client 104 to access register status 304 or access EEPROM 320. Signals are received from the MII bus 252 by interface unit 312 and passed to RX FIFO 310.

Micro-controller 302 accesses EEPROM 320 through EEPROM interface 314 to obtain values to create network packets such as source and destination MAC addresses, IP protocol information, authentication headers, and Universal Data Packet headers. Further, EEPROM 320 retains the Universal Unique Identifier (UUID).

Figure 4A:
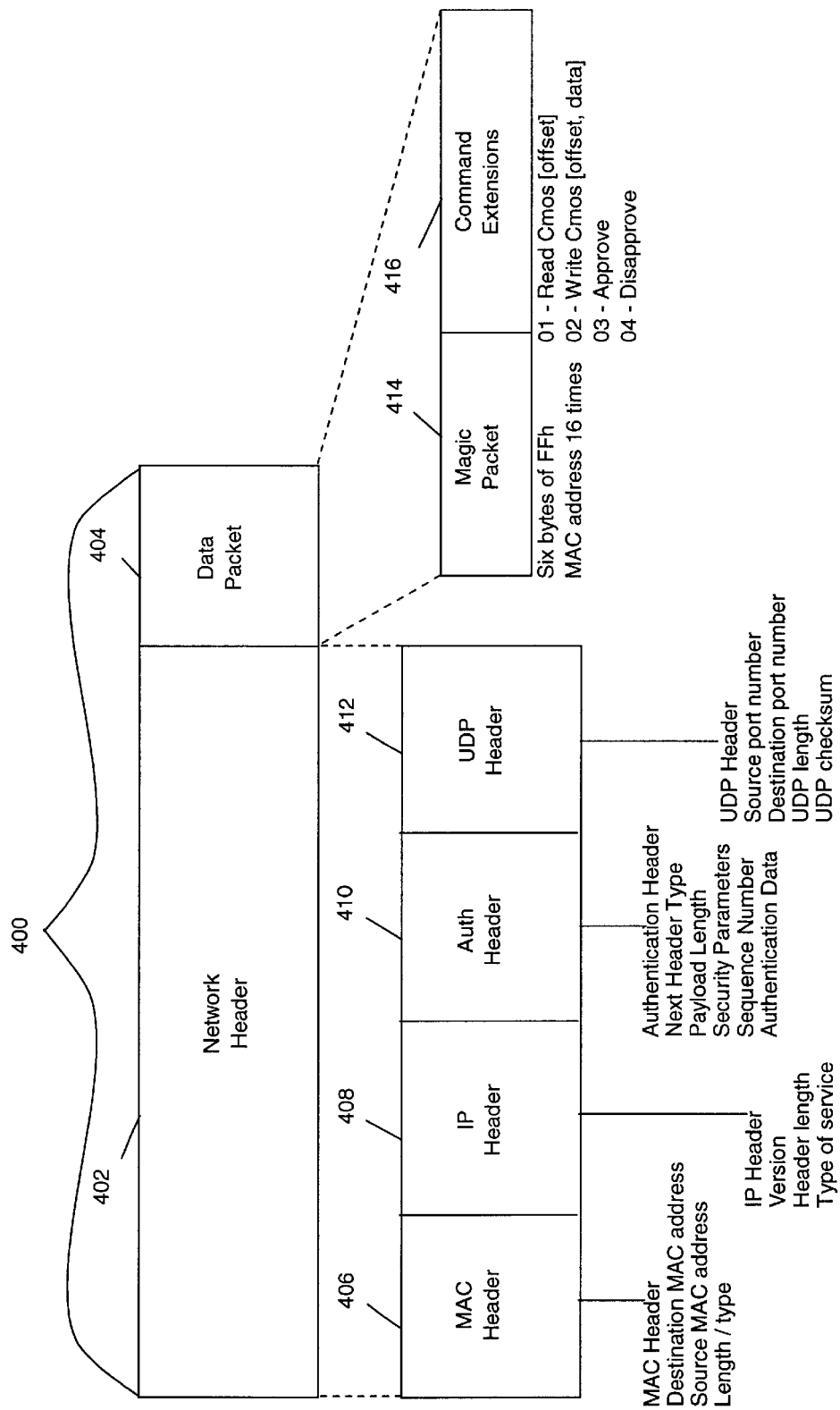
FIG. 4A illustrates a pictorial representation of a network packet, including a network header and a data packet, which may be transmitted by a server computer system to a client over the network in accordance with the method and system of the present invention.

FIG. 4A illustrates a pictorial representation of a network packet 400, including a network header 402 and a data packet 404, which may be transmitted by a server computer system over the network to a client computer system in accordance with the method and system of the present invention. Each network packet 400 includes a network header 402 and a data packet 404.

Network header 402 includes a MAC header 406, IP header 408, authentication header 410, and UDP header 412 which are all known in the art to provide addresses, identifiers, and other information for assuring correct transfer of the packet. Data packet 404 includes the information content to be transferred.

Data packet 404 includes a magic packet 414 and command extensions 416. The content of Magic packet 414 is six bytes of "FF" followed by 12 copies of client MAC addresses. Magic packet 414 is a specialized type of packet. Magic packet 414 is a management packet which does not include standard network data. When magic packet 414 is detected utilizing the six bytes of "FF", MAC 232 will ignore magic packet 414.

Data packet 404 also may include command extensions 416. Command extensions 416 includes a READ command, a WRITE command, an approval, or disapproval. Server computer system 100 may specify one of a plurality of command extensions in data packet 404 in order to cause ASIC 300 to modify the network activity of client 104.

When a network packet 400 is received by client 104, it is received by physical layer 234 and placed on the MII bus 252. When network packet 400 includes magic packet 414, MAC 232 detects that it includes magic packet 414, and then MAC 232 ignores any command extensions 416.

ASIC 300 also receives network packet 400 utilizing the MII interface 312. Data packet 404 is transferred to RX FIFO 310 and then to RX buffer 318. Micro-controller 302 then inspects data packet 404 and determines whether data packet 404 includes command extensions 416. If command extensions 416 are included, the appropriate function is executed in accordance with the description which follows.

Figure 4B:
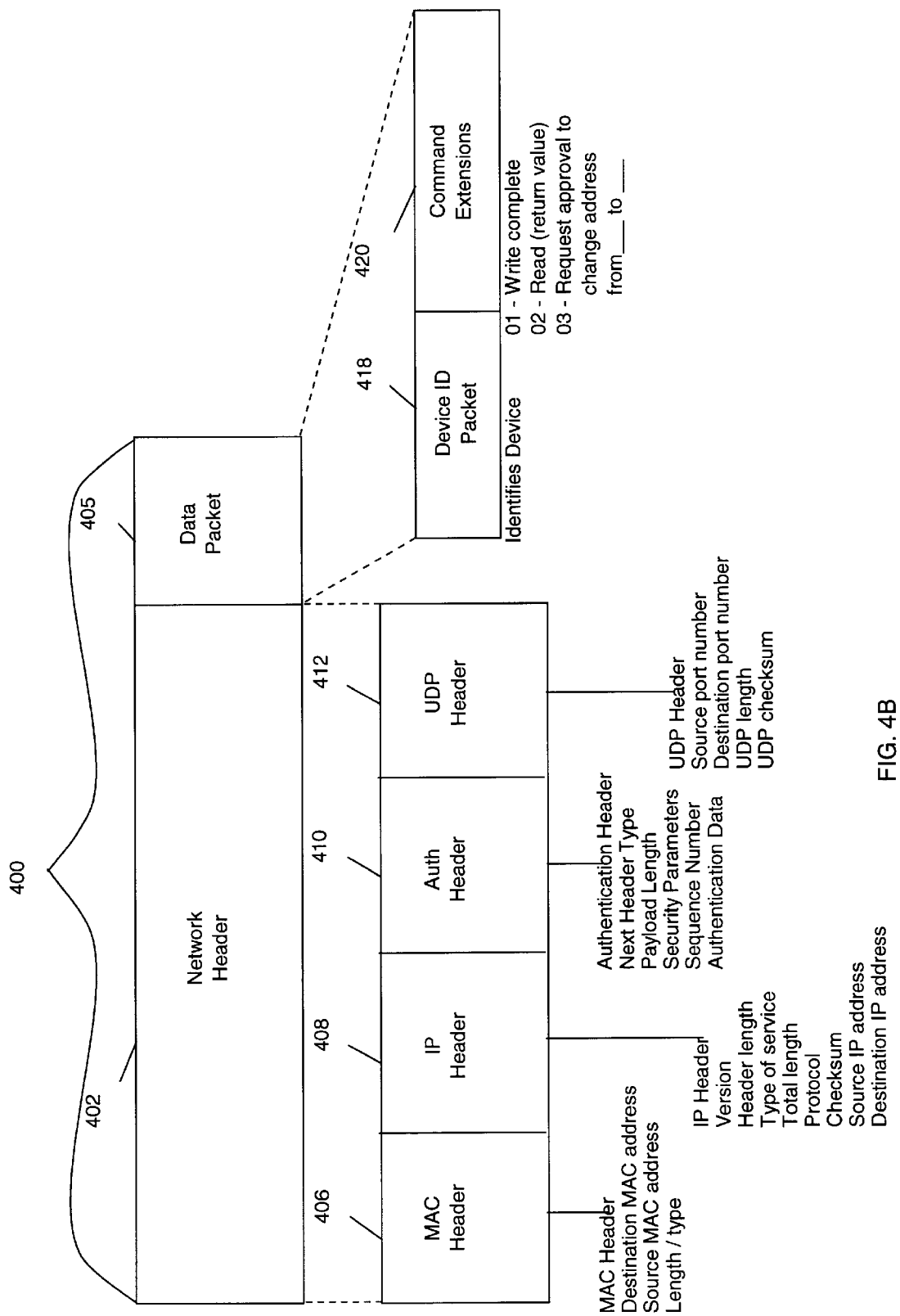
FIG. 4B illustrates a pictorial representation of a network packet, including a network header and a data packet, which may be transmitted by a client computer system to a server over the network in accordance with the method and system of the present invention.

FIG. 4B illustrates a pictorial representation of a network packet 400, including a network header 402 and a data packet 405, which may be transmitted by a client computer system over the network to a server computer system in accordance with the method and system of the present invention. Each network packet 400 includes a network header 402 and a data packet 405.

Data packet 405 includes a device identifier packet 418 and command extensions 420. Device identifier packet 418 includes information which identifies the particular client which created the packet. Command extensions 420 include a command indicating that the write was complete, the read was complete and includes the value read, or a request by the client to change an address from a first, unmodified value to a new, modified value.

Figure 5:
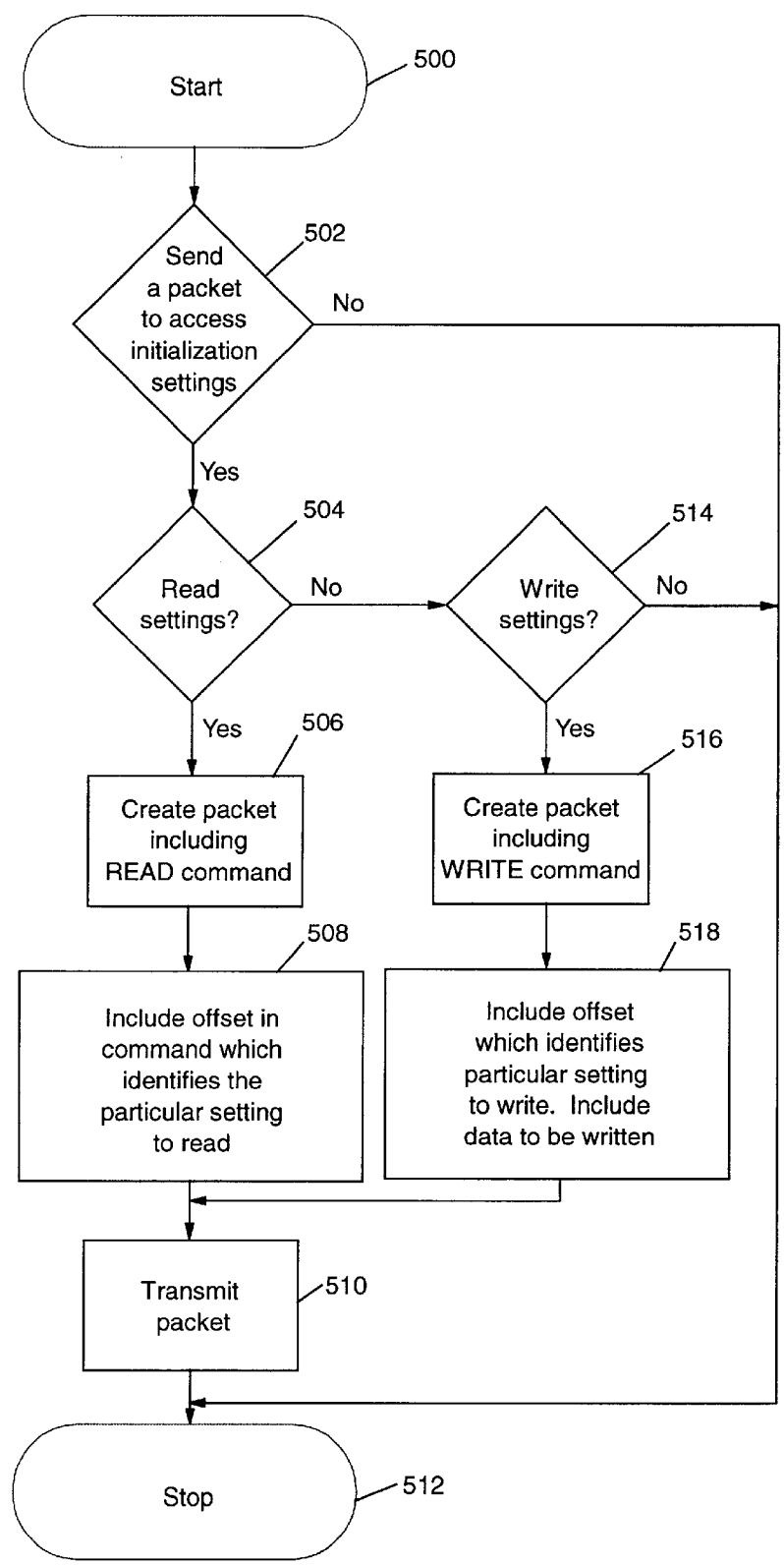
FIG. 5 depicts a high level flow chart which illustrates a server computer system transmitting a signal to a client computer system to access one of the initialization settings of the client in accordance with the method and system of the present invention.

FIG. 5 depicts a high level flow chart which illustrates a server computer system transmitting a command to access one of a plurality of initialization settings included within a client computer system in accordance with the method and system of the present invention. The process starts as depicted by block 500 and thereafter passes to block 502 which illustrates a determination of whether or not the server will transmit a network packet to a client which includes a command to access initialization settings within the client. If a determination is made that the server will not transmit such packet, the process terminates as depicted by block 512.

Referring again to block 502, if a determination is made that the server will transmit a network packet including a command to access initialization settings within the client, the process passes to block 504 which illustrates a determination of whether or not the server will transmit a packet which includes a command to read one of the initialization settings. If a determination is made that the server will transmit a packet which reads an initialization setting within the client, the process passes to block 506 which depicts the server creating a packet which includes a read command. Next, block 508 illustrates including an offset in the read command. The offset identifies the particular setting which is to be read. The offset is a value which defines a location within the CMOS storage which includes the particular setting.

Thereafter, block 510 depicts the server transmitting the network packet. The process then terminates as illustrated by block 512.

Referring again to block 504, if a determination is made that the packet will not include a command to read an initialization setting, the process passes to block 514 which depicts a determination of whether or not the packet will include a command to write data to an initialization setting. If a determination is made that the command will not include a command to write data, the process terminates as illustrated by block 512.

Referring again to block 514, if a determination is made that the packet will include a command to write data to a particular initialization setting, the process passes to block 516 which depicts the creation of a packet which includes a write data command. Next, block 518 illustrates including an offset which identifies a particular setting. Block 518 also illustrates including the data which is to be written to this setting. This new data will be written into the location of CMOS storage which is identified by the offset. The process then passes to block 510.

Figure 6:
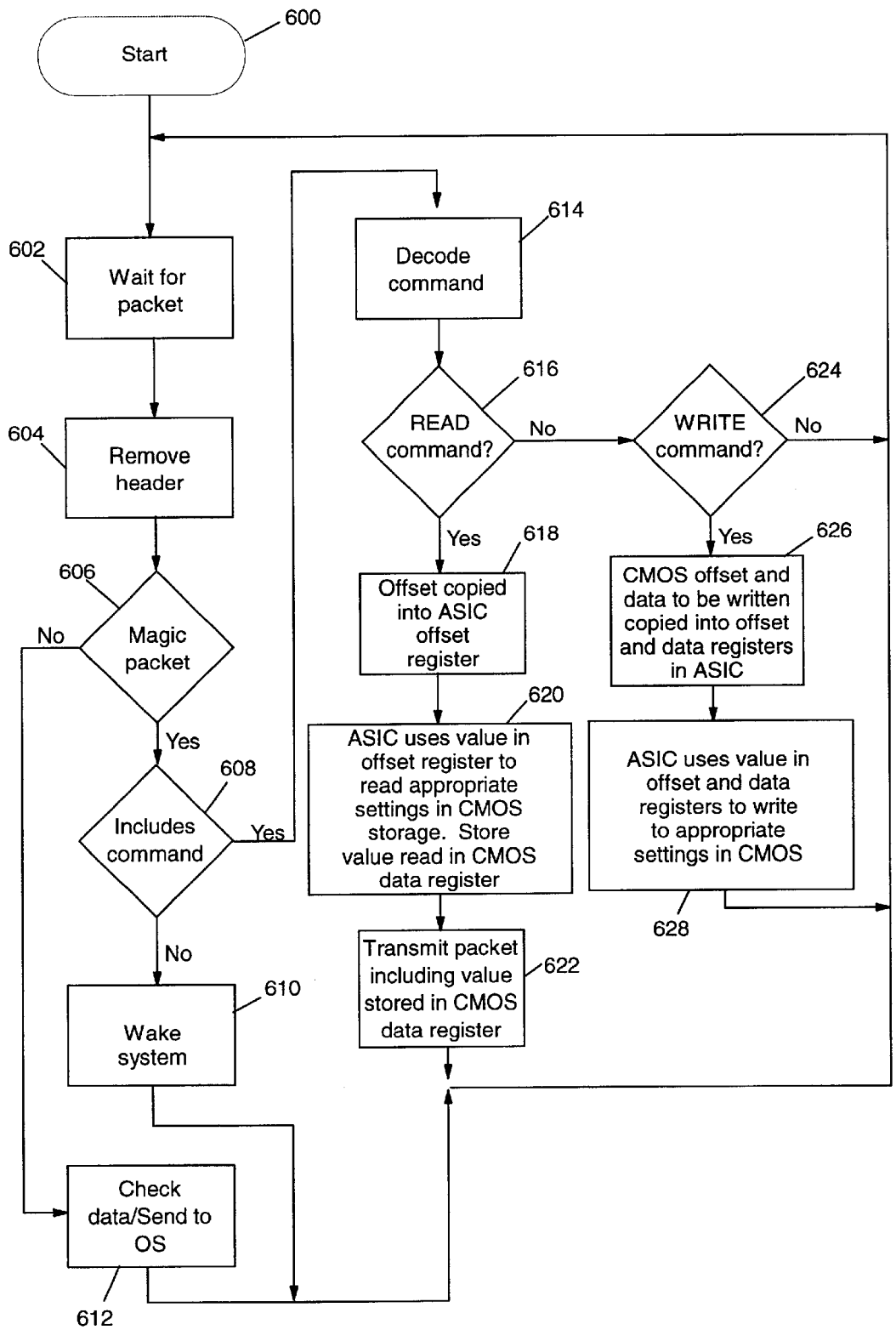
FIG. 6 illustrates a high level flow chart which depicts a client computer system receiving a signal from a server computer to access one of the initialization settings of the client in accordance with the present invention.

FIG. 6 illustrates a high level flow chart which depicts a client computer system processing a command to access one of a plurality of initialization settings included within the client computer system in accordance with the present invention. The process starts as depicted by block 600 and thereafter passes to block 602 which illustrates a micro-controller 302 included within a client computer system waiting to receive network packet 400. When the packet has been received, physical layer 234 places data packet 404 included within network packet 400 on the MII bus 252. The MII bus 252 is read by MII interface 312 of ASIC 300. ASIC 300 transfers data packet 404 from MII interface 312 to RX FIFO 310 and to RX buffer 318.

The process then passes to block 604 which depicts micro-controller 302 removing network header 402 from the packet. Next, block 606 illustrates a determination by micro-controller 302 whether data packet 404 included magic packet 414. If a determination is made that data packet 404 did not include magic packet 414, the process passes to block 612 which depicts the data included within data packet 404 being sent to the operating system (OS). The process then passes back to block 602.

Referring again to block 606, if a determination is made that data packet 404 did include magic packet 414, the process passes to block 608 which illustrates a determination of whether or not data packet 404 also included additional commands 416. If a determination is made that data packet 404 does not include any additional commands 416, the process passes to block 610 which depicts the transmission of a wakeup command which will cause the client to power up. The process then passes back to block 602.

Referring again to block 608, if a determination is made that data packet 404 does include additional commands 416, the process passes to block 614 which depicts the decoding of the additional commands 416. Next, block 616 illustrates a determination of whether or not the command is a "READ data" command. If a determination is made that the command is a "READ data" command, the process passes to block 618 which depicts the offset included within the command being copied into register 305. The process then passes to block 620 which illustrates ASIC 300 using the value stored in register 305 to access CMOS 213. The value stored in register 305 is an index into CMOS 213 which identifies a particular storage location within CMOS 213. The value stored in the location identified by the offset is then stored in register 307. Micro-controller 302 uses offset register 305 and data register 307 to access, through SM bus interface 316, CMOS 213. Next, block 622 depicts the server transmitting a network packet to the server which includes the value stored in register 307. In this manner, the particular location within CMOS 213 is read, and that data transmitted to the server. The process then passes back to block 602.

Referring again to block 616, if a determination is made that the command is not a "READ data" command, the process passes to block 624 which illustrates a determination of whether or not the command is a "WRITE data" command. If a determination is made that the command is not a "WRITE data" command, the process passes back to block 602. Referring again to block 624, if a determination is made that the command is a "WRITE data" command, the process passes to block 626 which depicts the offset included within the WRITE command being written into register 305, and the data included within the WRITE command being written into register 307. Next, block 628 illustrates ASIC 300 using the values stored in register 305 to access the location within CMOS 213 to be accessed and updated. The value stored in register 307 is written into that location within CMOS 213. The process then passes back to block 602.

Figure 7:
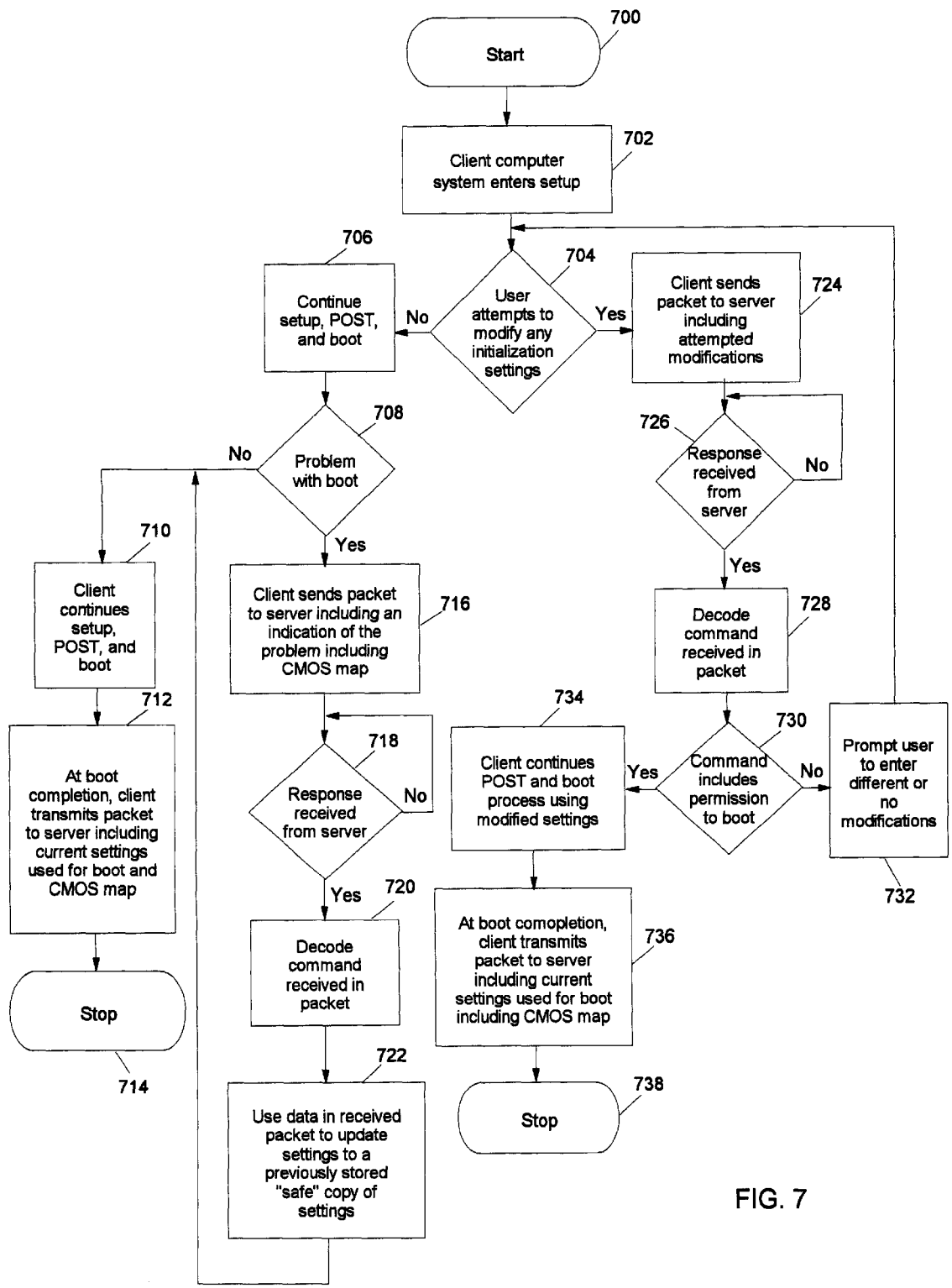
FIG. 7 illustrates a high level flow chart which depicts a client computer system executing a set-up process utilizing a plurality of initialization settings in accordance with the method and system of the present invention.

FIG. 7 illustrates a high level flow chart which depicts a client computer system executing a set-up process utilizing a plurality of initialization settings in accordance with the method and system of the present invention. The process starts as depicted by block 700 and thereafter passes to block 702 which illustrates a client computer system entering a set-up process. The set-up process is then executed by the client utilizing a plurality of initialization settings. Next, block 704 depicts a determination of whether or not a user has attempted to modify any of the initialization settings. If a determination is made that a user has not attempted to modify any of the initialization settings, the process passes to block 706 which illustrates the client continuing the execution of set-up, the power-on-self-test (POST), and the boot process. Thereafter, block 708 depicts a determination of whether or not a problem, or an abnormality in execution, occurred with the set-up process.

The process then passes to block 710 which illustrates the client continuing the execution of the set-up, POST, and boot processes. Next, block 712 depicts the client transmitting a packet to the server, in response to the completion of the boot process, including current initialization settings used during the execution of the boot process. The CMOS map is also transmitted to the server. The process then terminates as illustrates by block 714.

Referring again to block 708, if a determination is made that the client computer system executed the set-up process, POST, and the boot process with a problem occurring during the execution, the process passes to block 716. Block 716 depicts the client transmitting the packet to the server including an indication of the problem which occurred during the execution. The packet the client transmits to the server includes a copy of the CMOS map which describes a location within CMOS for each type of initialization setting. Next, block 718 illustrates a determination of whether or not the client received a response from the server. If a determination is made that the client received a response from the server, the process passes to block 720 which depicts the client decoding the command included within the received packet. Thereafter, block 722 depicts the client using the data received in the packet along with the command to update the initialization settings included within the client utilizing a previously stored "safe" copy of these settings. The server updates the settings using the WRITE command. The process then passes to block 710.

Referring again to block 704, if a determination is made that the user has attempted to modify any or all of the initialization settings, the process passes to block 724 which illustrates the client transmitting a packet to the server including the attempted modifications. Next, block 726 depicts a determination of whether or not the client has received a response from the server. If a determination is made that the client has not received a response from the server, the process passes back to block 726.

Referring again to block 726, if a determination is made that the client has received a response from the client, the process passes to block 728 which illustrates the client decoding the command included within the received packet. The process then passes to block 730 which depicts a determination of whether or not the command is a permission to boot utilizing the modified initialization settings. A preferred method for implementing the permission/prohibition to make the attempted modification is to require POST to determine during setup if it received an approval or disapproval from the server in response to its request to change the settings. If a determination is made that the command is not a permission to boot utilizing the modified initialization settings, the process passes to block 732 which illustrates the client computer system prompting the user to enter new initialization settings. The process then passes to block 704.

Referring again to block 730, if a determination is made that the command is a permission to boot utilizing the modified initialization settings, the process passes to block 734 which depicts the client continuing the execution of the set-up process, POST, and the boot process utilizing the modified initialization settings. Next, block 736 illustrating the client transmitting a packet to the server at the completion of the boot process of a packet including the modified initialization settings used to complete the boot process. The CMOS map is also transmitted. The process then terminates as depicted by block 738.

Figure 8:
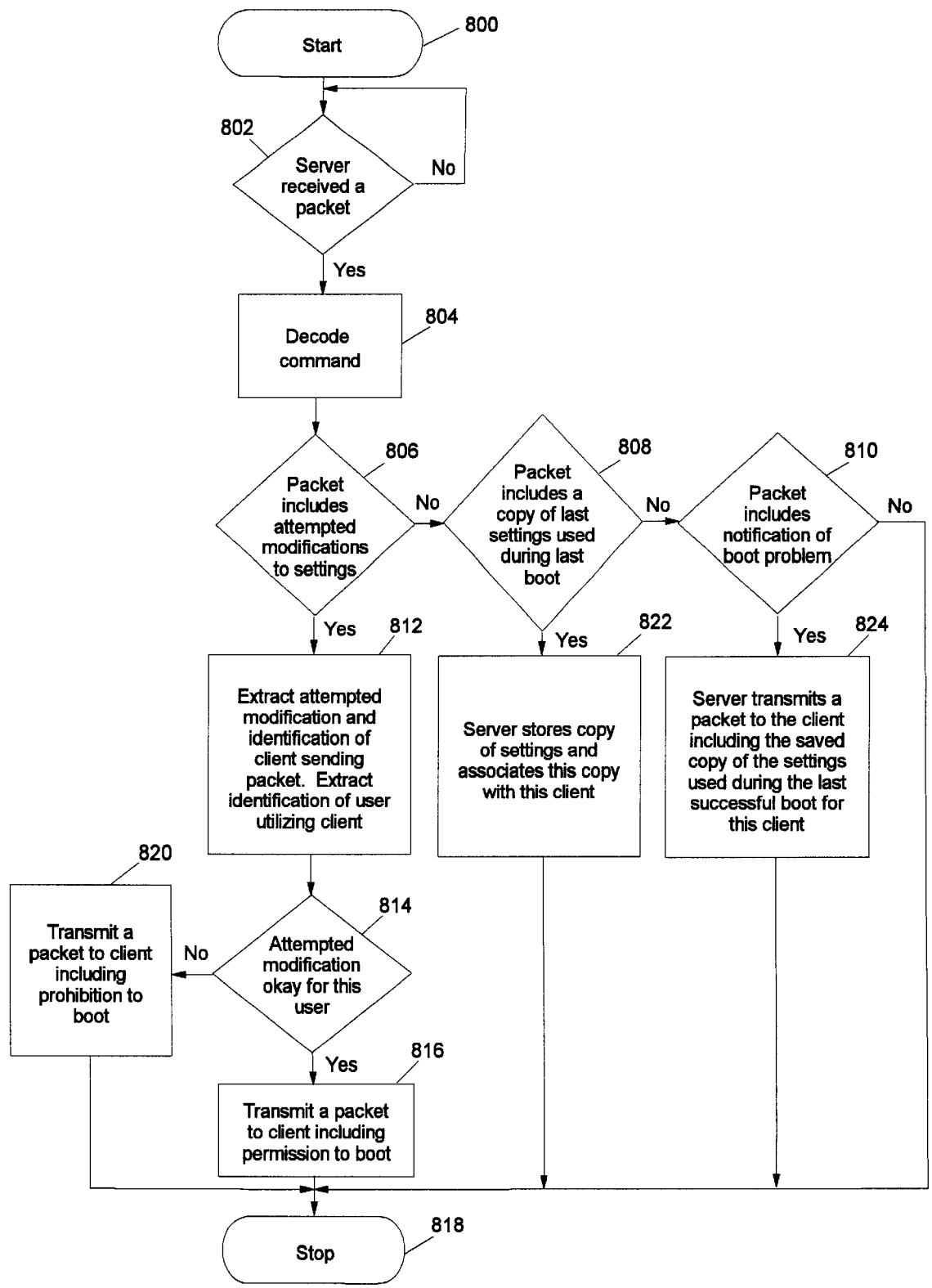
FIG. 8 depicts a high level flow chart which illustrates a server computer system controlling the booting of a client computer system in accordance with the method and system of the present invention.

FIG. 8 depicts a high level flow chart which illustrates a server computer system controlling the booting of a client computer system in accordance with the method and system of the present invention. The process starts as depicted by block 800 which illustrates a determination of whether or not the server computer system has received a packet. If a determination is made that the server has not received a packet, the process passes back to block 802. Referring again to block 802, if a determination is made that the server has received a packet, the process passes to block 804.

Block 804 illustrates the server decoding the received command. Next, block 806 depicts a determination of whether or not the packet included the attempted modifications to the initialization settings. If a determination is made that the packet did not include the attempted modifications, the process passes to block 808 which illustrates a determination of whether or not the packet included a copy of the last initialization settings used during the last successful boot process. If a determination is made that the packet did not include a copy of the last initialization settings used during the last successful boot process, the process passes to block 810. Block 810 depicts a determination of whether or not the packet includes a notification of a problem which occurred during the boot process. If a determination is made that the packet does not include a notification of a problem which occurred during the boot process, the process terminates as illustrated by block 818.

Referring again to block 806, if a determination is made that the packet did include the attempted modifications, the process passes to block 812 which illustrates the server extracting the modified settings and the identification of the client which sent the packet. The identity of the user is also extracted from the packet. Next, block 814 depicts a determination of whether or not the server determines that the attempted modification of the initialization settings will be permitted by the server. If a determination is made that the attempted modification is permitted, the process passes to block 816 which depicts the server transmitting a packet to the client including a permission to boot. The process then terminates as illustrated by block 818.

Referring again to block 814, if a determination is made that the attempted modification will be prohibited, the process passes to block 820 which depicts the server transmitting a packet to the client which includes a prohibition to boot. The process then terminates as illustrated by block 818.

Referring again to block 808, if a determination is made that the packet did include a copy of the last initialization settings used during the last successful boot process, the process passes to block 822. Block 822 depicts the server storing the copy of the initialization settings received within the packet from the client. This copy of initialization settings is associated with this client. The process then terminates as illustrated by block 818.

Referring again to block 810, if a determination is made that the packet does include a notification of a problem which occurred during the boot process, the process passes to block 824. Block 824 illustrates the server transmitting a packet to the client including the saved copy of the initialization settings used during the last successful boot for this client. The process then terminates as depicted by block 818.

While a preferred embodiment has been particularly shown and described, it will be understood by those skilled in the art that various changes in form and detail may be made therein without departing from the spirit and scope of the present invention.

What is claimed is:

1. A method in a data processing system for permitting a server computer system to remotely control modifications of initialization settings included within a client computer system, said client computer system being coupled to a server computer system to form a network, said method comprising the steps of:

during a set-up process executing within said client computer system, said client computer system receiving an attempted modification of one of a plurality of initialization settings utilized during said booting;

in response to said attempted modification, said server computer system determining whether said modification is prohibited;

in response to said modification being prohibited, said server computer system transmitting a signal to said client computer system prohibiting said modification of said one of said plurality of initialization settings, wherein said client computer system is prohibited from booting utilizing said modified one of said plurality of initialization settings and permitted to boot utilizing said unmodified plurality of initialization settings;

determining an abnormality occurring during execution of said set-up process and temporarily halting said execution during execution of said set-up process utilizing said plurality of initialization settings or said modified plurality of initialization settings;

in response to said determination, said server computer system transmitting a safe copy of said plurality of initialization settings stored in said server computer in response to a previous, successful completion of said execution; and said client computer system continuing said set-up process execution utilizing said safe copy of said plurality of initialization settings, wherein said client computer system successfully completes said set-up process execution.

2. The method according to claim 1, further comprising the steps of:

in response to said modification being permitted, said server computer system transmitting a command to said client computer system permitting said modification;

in response to a receipt of said command, said client computer system modifying said plurality of initialization settings; and said client computer system utilizing said modified plurality of initialization settings during said set-up process, wherein said client computer system is permitted to boot utilizing said modified plurality of initialization settings.

3. The method according to claim 1, further comprising the step of associating said safe copy of said plurality of initialization settings with said client computer system.

4. The method according to claim 3, wherein said step of said server computer system determining whether said modification is prohibited further comprises the step of:

said server computer system determining an identity of a user currently utilizing said client computer system; and said server computer system determining whether said attempted modification is prohibited from being made by said user.

5. The method according to claim 2, further comprising the step of during said execution of said set-up process, said server computer system updating a stored copy of said plurality of initialization settings in response to a permitted modification of said initialization settings.

6. A data processing system for permitting a server computer system to remotely control modifications of initialization settings included within a client computer system, said client computer system being coupled to a server computer system to form a network, comprising:

during a set-up process executing within said client computer system, said client computer system executing code for receiving an attempted modification of one of a plurality of initialization settings utilized during said booting;

in response to said attempted modification, said server computer system executing code for determining whether said modification is prohibited;

in response to said modification being prohibited, said server computer system executing code for transmitting a signal to said client computer system prohibiting said modification of said one of said plurality of initialization settings, wherein said client computer system is prohibited from booting utilizing said modified one of said plurality of initialization settings and permitted to boot utilizing said unmodified plurality of initialization settings;

during said execution of said set-up process utilizing said plurality of initialization settings or said modified plurality of initialization settings, said client computer system executing code for determining an abnormality occurring said execution of said set-up process and temporarily halting said execution;

in response to said determination, said server computer system executing code for transmitting a safe copy of said plurality of initialization settings stored in said server computer system in response to a previous, successful completion of said execution; and said client computer system executing code for continuing said set-up process execution utilizing said safe copy of said plurality of initialization settings, wherein said client computer system successfully completes said set-up process execution.

7. The system according to claim 6, further comprising:

in response to said modification being permitted, said server computer system executing code for transmitting a command to said client computer system permitting said modification;

in response to a receipt of said command, said client computer system executing code for modifying said plurality of initialization settings; and said client computer system executing code for utilizing said modified plurality of initialization settings during said set-up process, wherein said client computer system is permitted to boot utilizing said modified plurality of initialization settings.

8. The system according to claim 6, further comprising said server computer system executing code for associating said safe copy of said plurality of initialization settings with said client computer system.

9. The system according to claim 8, further comprising:

said server computer system executing code for determining an identity of a user currently utilizing said client computer system; and said server computer system executing code for determining whether said attempted modification is prohibited from being made by said user.

10. The system according to claim 7, further comprising during said execution of said set-up process, said server computer system executing code for updating a stored copy of said plurality of initialization settings in response to a permitted modification of said initialization settings.

* * * * *